United States Patent
Chaddha et al.

[11] Patent Number: 6,151,632
[45] Date of Patent: Nov. 21, 2000

[54] METHOD AND APPARATUS FOR DISTRIBUTED TRANSMISSION OF REAL-TIME MULTIMEDIA INFORMATION

[75] Inventors: Navin Chaddha, Sunnyvale; David del Val, Mountain View; Srinivas Prasad Vellanki, Milpitas, all of Calif.

[73] Assignee: Microsoft Corporation, Redmond, Wash.

[21] Appl. No.: 08/865,788

[22] Filed: May 30, 1997

Related U.S. Application Data

[63] Continuation-in-part of application No. 08/818,127, Mar. 14, 1997.

[51] Int. Cl.⁷ .................................................. G06F 15/16
[52] U.S. Cl. ........................ 709/231; 709/208; 348/384
[58] Field of Search .................................. 709/208, 216, 709/217, 218, 231, 219; 395/800.31; 340/825, 855.7; 348/384, 385, 388; 370/468

[56] References Cited

U.S. PATENT DOCUMENTS

| | | | |
|---|---|---|---|
| 4,931,950 | 6/1990 | Isle et al. ................. | 364/513 |
| 5,119,474 | 6/1992 | Beitel et al. ............... | 395/154 |
| 5,274,758 | 12/1993 | Beitel et al. ............... | 395/154 |
| 5,400,087 | 3/1995 | Uramoto et al. ............. | 348/699 |
| 5,455,910 | 10/1995 | Johnson et al. ............. | 395/650 |
| 5,485,211 | 1/1996 | Kuzma ..................... | 348/409 |
| 5,487,167 | 1/1996 | Dinallo et al. ............. | 395/650 |
| 5,533,021 | 7/1996 | Branstad et al. ........... | 370/60.1 |
| 5,537,408 | 7/1996 | Branstad et al. ........... | 370/79 |
| 5,577,258 | 11/1996 | Cruz et al. ................. | 395/800 |
| 5,583,561 | 12/1996 | Baker et al. ............... | 348/7 |
| 5,594,911 | 1/1997 | Cruz et al. ................. | 395/800 |
| 5,621,728 | 4/1997 | Lightfoot et al. .......... | 370/397 |
| 5,623,690 | 4/1997 | Palmer et al. .............. | 395/806 |
| 5,635,979 | 6/1997 | Kostreski et al. .......... | 348/13 |
| 5,666,487 | 9/1997 | Goodman et al. .......... | 709/246 |
| 5,675,732 | 10/1997 | Majeti et al. .............. | 709/235 |
| 5,699,484 | 12/1997 | Davis ....................... | 704/219 |
| 5,778,187 | 7/1998 | Monteiro et al. ........... | 709/231 |
| 5,805,804 | 9/1998 | Laursen ..................... | 348/7 |
| 5,815,505 | 9/1998 | Mills ........................ | 370/522 |
| 5,886,995 | 3/1999 | Arsenault et al. .......... | 370/477 |
| 5,892,535 | 4/1999 | Allen et al. ................ | 348/9 |
| 5,892,915 | 4/1999 | Duso et al. ................ | 709/219 |
| 5,918,002 | 6/1999 | Klemets et al. ............ | 455/7 |
| 5,940,072 | 8/1999 | Jahanghir et al. .......... | 345/327 |
| 6,012,100 | 1/2000 | Frailong et al. ............ | 709/250 |

OTHER PUBLICATIONS

Chaddha, N., et al., "An end to end software only scalable video delivery system", *Proceedings Networks and Operating System Support for Digital Audio and Video*, pp. 130–141, (Apr. 21, 1995).

Primary Examiner—Zarni Maung
Assistant Examiner—Jason D. Cardone
Attorney, Agent, or Firm—Schwegman, Lundberg, Woessner & Kluth, P.A.

[57] ABSTRACT

A method and apparatus for delivering real-time multimedia information to clients via a distributed network is provided. The method and apparatus includes a LiveStation for encoding the real-time multimedia information into a number of different bandwidth points, and associated indexes, each bandwidth point for transmission over data channels of a particular bandwidth. The bandwidth points and indexes are provided to a recaster server to push the bandwidth points and indexes in parallel to secondary servers. The secondary servers then provide clients with compressed multimedia information according to the type of data channel used for connection. Parallel transmission of multiple bandwidth points and indexes allows the secondary servers to dynamically switch bandwidth points if data channels to clients change during transmission. Protocol between the LiveStation and a Recaster server, and between Recaster servers and secondary servers, is provided to allow configuration and transmission of real-time multimedia information to be controlled over a computer network from a single point.

57 Claims, 4 Drawing Sheets

METHOD AND APPARATUS FOR DISTRIBUTED TRANSMISSION OF REAL-TIME MULTIMEDIA INFORMATION

CROSS-REFERENCE TO RELATED APPLICATIONS

This application is a continuation-in-part of U.S. patent application Ser. No. 08/818,127, filed Mar. 14, 1997 pending, entitled "DYNAMIC BANDWIDTH SELECTION FOR EFFICIENT TRANSMISSION OF MULTIMEDIA STREAMS IN A COMPUTER NETWORK".

BACKGROUND OF THE INVENTION

1. Field of the Invention

The present invention relates generally to the distribution of information in a client/server computer environment, and more specifically to a method and apparatus for delivering real-time multimedia information to clients via a distributed network.

2. Description of the Related Art

The creation of pictures or images has been a human activity since the beginning of humanity. However, until recent history viewing of an image required the viewer to be physically present at the image. This was geographically cumbersome. Photography, both still and motion, broke this geographic constraint by allowing pictures to be captured and transported independent of the physical images they represented. Television enhanced transmission of images, by sending images, recorded or live, to any geographic location capable of receiving a radio signal. But for the most part, viewers of television can only view images that are scheduled for transmission, rather than selecting images at will.

With the development of computers, and more specifically computers that are linked across a network, images stored on one computer may be demanded by a viewer at a remote computer, and almost instantaneously provided to the viewer's computer over the computer network. One computer network that is increasingly being used is the Internet, the well-known international computer network that links various military, government, education, nonprofit, industrial and financial institutions, commercial enterprises, and individuals.

To illustrate how computers are used to transmit images to a viewer, reference is made to FIG. 1. FIG. 1 represents a computer system 100 that includes a server 102 connected to a number of mass storage devices 104. The mass storage devices 104 are used to store a number of video frames 120. The video frames 120 can be still images, or can be combined into sequences to create moving pictures. The sequences reside on the mass storage devices 104, and upon request, may be transmitted by the server 102 to other computers 108 via a network 106. In addition, the video frames 120 may be transferred to remote computers, such as the computer 112, via a network 116, using a router 110 and/or a modem 114. One skilled in the art should appreciate that the network 116 could be a dedicated connection, or a dial-up connection, and could utilize any of a number of network protocols such as TCP/IP or Client/Server configurations.

In operation, a user sitting at any of the computers 108, 112 can request video frames 120 from the server 102, and the server will retrieve the video frames 120 from the mass storage devices 104, and transmit the frames 120 over the network 106. Upon receipt of the video frames 120, the computers 108, 112 displays the images for the requester.

It should be appreciated that the computers 108, 112 may be positioned physically close to the server 102, or may be thousands of miles away. The computers 108, 112 may be connected to the server 102 via a direct LAN connection such as Ethernet or Token Ring, or may utilize any of a number of different data channels such as plain old telephone service (POTS), ISDN or ADSL, depending on the availability of each of these services, their cost, and the performance required by the end user. As should be appreciated, the more bandwidth required by the user, the higher the cost.

In most cases, the amount of data required to represent a video frame, or more specifically a sequence of video frames 120 is significant. For example, a color image or frame is typically represented by a matrix of individual dots or pixels, each having a particular color defined by a combination of red, green and blue intensities (RGB). To create a palette of 16 million colors (i.e., true color), each of the RGB intensities are represented by an 8-bit value. So, for each pixel, 24-bits are required to define a pixel's color. A typical computer monitor has a resolution of 1024 pixels (across) by 768 pixels (down). So, to create a full screen image for a computer requires 1024×768×24 bits=18,874,368 bits, or 2,359,296 bytes of data to be stored. And that is just for one image.

If a moving picture is to be displayed, a sequence of images are grouped, and displayed one after another, at a rate of approximately 30 frames per second. Thus, a 1 second, 256 color, full screen movie could require as much as 60 megabytes of data storage. With present technology, even very expensive storage systems, and high speed networks would be overwhelmed if alternatives were not provided.

One alternative to reducing the amount of data required to represent images or moving pictures is to simply reduce the size of frames that are transmitted and displayed. One popular frame size is 320 pixels in width and 240 pixels in height, or 320×240. Thus, a 256 color frame of this size requires 320×240×24=1,843,200 bits, or 230 kilobytes of data. This is significantly less ($1/10^{th}$) than what is required for a full screen image. However, as frames are combined into moving pictures, the amount of data that must be transmitted is still significant.

An additional solution to reducing the amount of space required for video frames involves compressing the data, i.e., data is compressed before it is transmitted to a remote computer, and then decompressed by the remote computer before viewing. One skilled in the art will appreciate that a number of different compression methodologies have been developed, each directed at providing optimum compression for a particular data channel. In general, greater compression strategies are used where video frames are to be transmitted over low bandwidth connections, such as a standard analog telephone line. Faster compression strategies, that provide higher resolution images but lesser compression ratios, are typically used where high speed data channels transmit the video frames. Thus, depending on the speed of the data channel connection to a client, different compression methods may be used.

However, providing different compression methodologies for a single video sequence is problematic when attempting to transmit a video sequence to a large number of clients using a prior art distributed network. This will best be understood by providing a brief overview of a prior art solution for distributing video to a large number of clients, using a method referred to as "splitter" technology.

In the prior art, if a single server is used to provide a compressed video sequence to a number of different clients, the server may be overwhelmed by requests to the point where transmission performance to one or all of the clients is hindered. A solution to this problem has been to provide a primary server that serves a number of secondary servers, that in turn serve clients. In operation, a request for a video sequence is made by a client, causing its secondary server to request the compressed video sequence from the primary server. Upon receipt, the secondary server provides the compressed video sequence to the client. In addition, the secondary server stores the compressed video sequence so that for future requests, it can provide the compressed sequence to clients without disturbing the primary server. The task of providing the video sequence to the clients has thus been "split" according to the number of secondary servers used to provide the sequence to clients. This prior art solution of splitting has at least three inherent problems.

First, the secondary servers are viewed by the primary server as a client, which means that the information received by, and stored on the secondary server, is an exact replica of what will ultimately be provided to the client. While not discussed above, one skilled in the art should appreciate that the compressed video provided to a client only contains image data, and/or audio data, but does not contain any index information relating to the data. Such index information is often used to allow a user to rewind, fast forward, or seek for a particular location within a video sequence. When a client connected to a primary server, the primary server allowed clients to seek, rewind, etc. However, since the index information is not transferred to a client, and thus is not transferred to secondary servers, the client loses this indexing capability.

A second problem associated with splitter technology is that since the secondary servers do not contain compressed video for all possible data channels, the secondary servers are unable to dynamically switch video transmission to a client when the bandwidth of their data channels is altered. For example, if a client requests data from a secondary server over a high bandwidth data channel, the data received by the secondary server from the primary server will be for a high bandwidth data channel. If the data channel loses some of its bandwidth during transmission, the secondary server cannot effectively continue the data transmission to the client.

A third problem inherent in splitter technology is that since secondary servers merely request video sequences on behalf of clients, multiple clients accessing a secondary server over different data channels require the secondary server to make multiple requests to the primary server for different compressed video sequences. For example, a first client might request a compressed video sequence associated with transmission over a 28.8 Kbps telephone line. A second client might request the compressed video sequence associated with transmission over a 56 Kbs telephone line. The secondary server, in this instance, would be required to initiate two data transfer sessions with the primary server, one for the 28.8 Kbs video sequence, another for the 56 Kbs video sequence. Making multiple requests to the primary server hinders performance of the primary server, with the situation being further perturbed according to the number of different data channels supported by the secondary servers.

SUMMARY OF THE INVENTION

What is needed is method and apparatus that overcomes the problems discussed above in delivering real-time video information to a large number of clients utilizing different data channels in a distributed network.

More specifically, what is needed is a computer network that distributes video data to a number of different clients using different data channels. In one embodiment of the present invention, a computer network is provided that includes an encoding server, a recaster server, and a secondary server. The encoding server is connected to a video source that provides real-time video data to be distributed over the computer network. The encoding server encodes the video data into a video file that includes a number of different bandwidth points. The bandwidth points correspond to different compressions of the video data, each encoded for distribution particular data channels. In addition, the video file contains a corresponding number of indexes that are associated with each of the bandwidth points. The indexes allow a client to index the video data, regardless of which bandwidth point is provided to him. The recaster server is connected to the encoding server to receive the video file, and to transfer the video file to the secondary server, or to a number of different secondary servers. The secondary server(s) then transmit(s) one of the bandwidth points to a client depending on the data channel used by the client to connect to the secondary server. Thus, any secondary server can provide the video data to any number of clients, on any number of different data channels, without having to access the recaster. Moreover, since the index files are available on the secondary server(s), clients can index the video data regardless of which data channel they use to connect to the secondary server.

In another embodiment of the present invention, what is provided is a client/server computing system that distributes real-time and on demand multimedia data from an encoding server to a number of clients using different data channels. The computing system includes a recaster server, a secondary server and a number of different clients. The recaster server receives a video file from the encoding server, and delivers the video file to a secondary server. Clients connect to the secondary server over a number of different data channels. The video file provided by the encoding server to the recaster server, and by the recaster server to the secondary server, includes a number of bandwidth points, each of which are encoded for transmission over different data channels. The video file also includes a number of corresponding indexes, associated with the bandwidth points. When the video file is transmitted by the recaster server to the secondary server, the bandwidth points and the associated indexes are transmitted in parallel, over multiple sessions, to allow clients, regardless of which data channel they use, to receive and index video data real-time.

In another aspect of the present invention, what is provided is a method to distribute real-time multimedia data to clients over different data channels. The method includes providing a recaster server for transferring a video file of encoded multimedia data to a secondary server, initiating transfer of the video file to the secondary server, and transferring the video file to the secondary server. The video file contains a number of bandwidth points and associated indexes that are transferred in parallel between the recaster server and the secondary server. By providing the bandwidth points and indexes in parallel to the secondary server, different clients can receive and view the multimedia data over different data channels at essentially the same time.

DESCRIPTION OF THE DRAWINGS

These and other objects, features, and advantages of the present invention will become better understood with regard to the following description, and accompanying drawings where.

DETAILED DESCRIPTION OF THE INVENTION

As mentioned above, a number of methodologies have been developed to compress video images so that they may be more easily stored or transmitted. One such method is described in co-pending U.S. application Ser. No. 08/818,127, filed Mar. 14, 1997 which is incorporated herein by reference. The methodology described in that invention provides an encoding strategy that encodes a sequence of video frames into a number of different bandwidth points, along with associated indexes. Each bandwidth point is an encoded/compressed version of the video sequence, applicable to a particular data channel. For example, one bandwidth point and index has the greatest compression, and is therefore applicable for transmission over a POTS line at 28.8 Kbs. Another bandwidth point and index has the least compression (but the greatest resolution), and is therefore applicable for transmission over a dual channel ISDN line at 128 Kbs. All of the bandwidth points are combined into a single video file and provided to a primary server.

Figure 1:
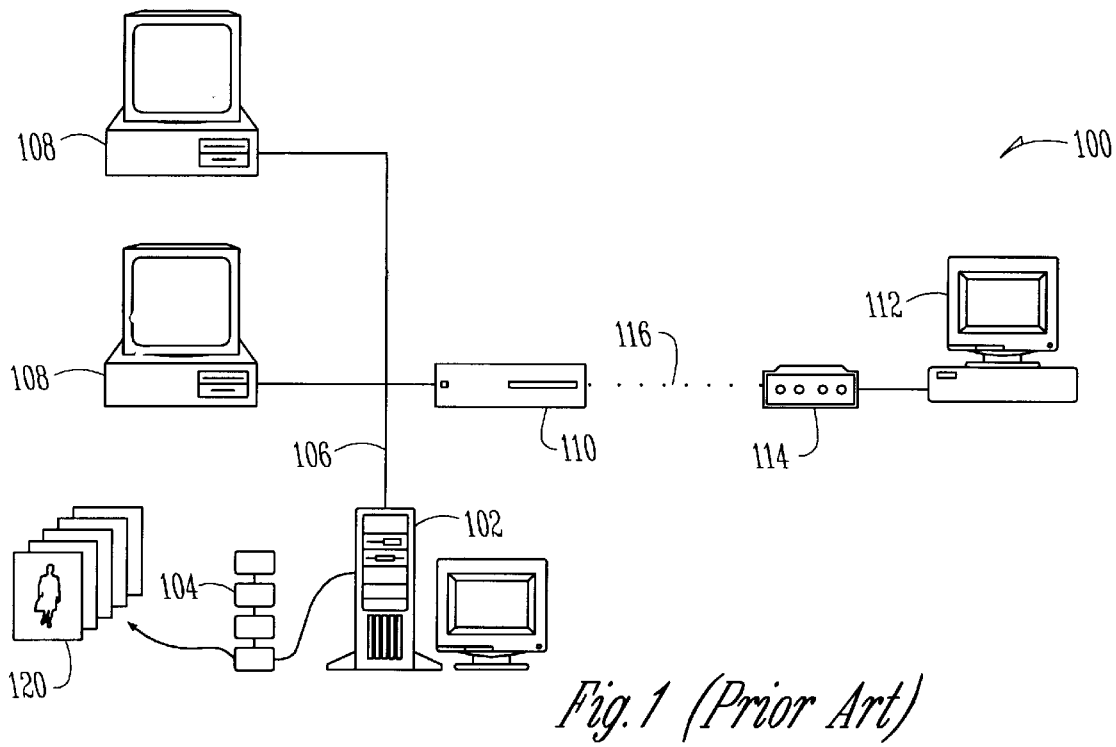
FIG. 1 is a prior art block diagram of a network computer system for distribution of stored video images to clients.
Figure 2:
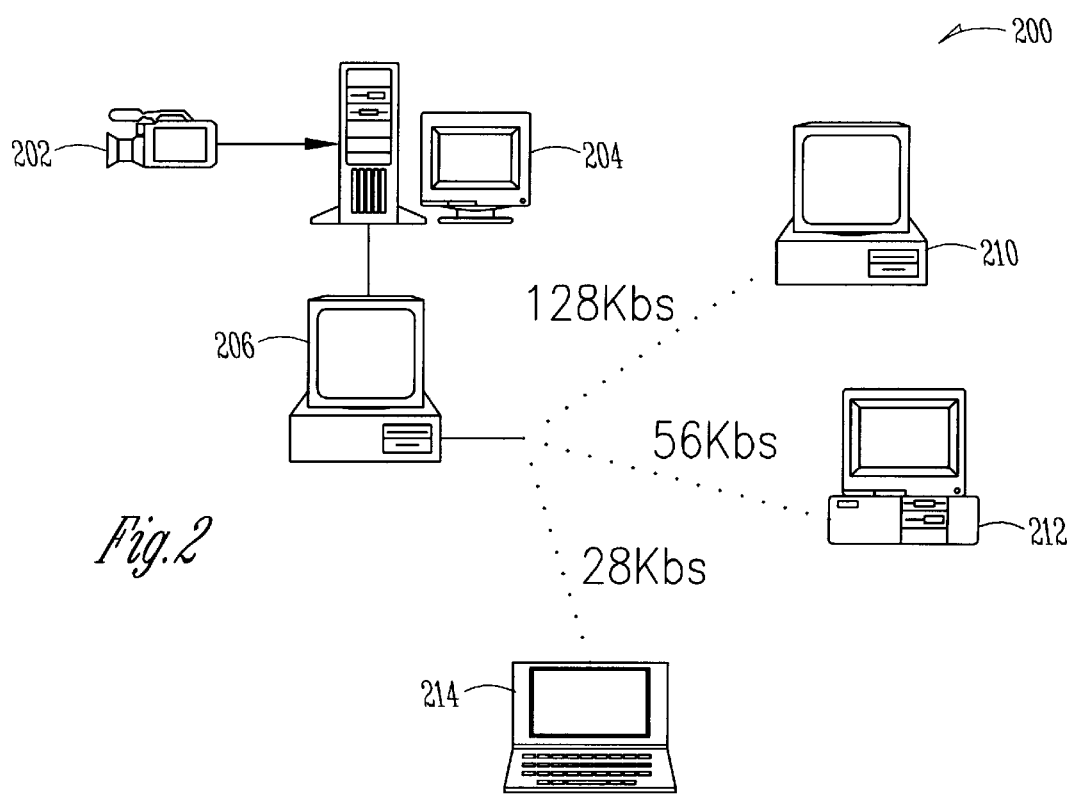
FIG. 2 is a block diagram of a network computer system for delivery of real-time video to a number of different clients over different data channels.

To better illustrate the advantages of this encoding methodology, reference is now made to FIG. 2. In FIG. 2, a computer network 200 is shown that provides a source 202 for capturing real-time video. The video is provided to an encoding server 204 that encodes the real-time video into a number of different bandwidth points, and associated indexes, as mentioned above. The bandwidth points and indexes are combined into a video file for delivery to a primary server 206. In one embodiment, one of the bandwidth points is encoded for delivery over a 28.8 Kbs telephone line, a second bandwidth point is encoded for delivery over a 56 Kbs ISDN line, and a third bandwidth point is encoded for delivery over a 128 Kbs line. One skilled in the art will appreciate that other bandwidth points may be encoded that are optimum for delivery over other data channels such as a local area network (LAN) or an ADSL line. In addition, if audio information is available, the encoding server 204 will encode the audio into a number of different audio bandwidth points, and associated indexes, for delivery over different data channels. In one embodiment, audio information is encoded to be delivered at 8 Kbs, and at 4 Kbs. The audio bandwidth points, and associated indexes, are combined into an audio file.

When the video file and the audio file are encoded, they are provided to a primary server 206 for delivery to a plurality of clients 210, 212 and 214. In FIG. 2, the client 214 connects to the primary server 206 over a 28.8 Kbs data channel, the client 212 connects to the primary server 206 over a 56 Kbs data channel, and the client 210 connects to the primary server 206 over a 128 Kbs data channel. Since the primary server 206 contains a bandwidth point, and associated index, for each of the data channel types, the primary server 206 can provide the real-time video to each of the clients 210, 212 and 214, without having to request further information from the encoding server.

Moreover, as also explained in the above referenced application, should any of the data channels used by the clients 210–214 change during connection, the primary server 206 can dynamically switch to an alternative bandwidth point, so that transmission of the video can continue. For example, if client 210 connects to the primary server 206 over a dual channel ISDN connection at 128 Kbs, and for some reason one of the channels drops, the primary server 206 can dynamically switch to the bandwidth point applicable to 56 Kbs, and can continue transmission. Thus, the computer system 200 provides delivery of real-time video to multiple clients connecting over different data channels. However, as was alluded to in the background, as the number of clients connected to the primary server increases, the performance of delivering video to the clients may be impacted. To better deliver real-time video to an even larger number of clients, the method and apparatus of the present invention will now be discussed with reference to FIG. 3.

Figure 3:
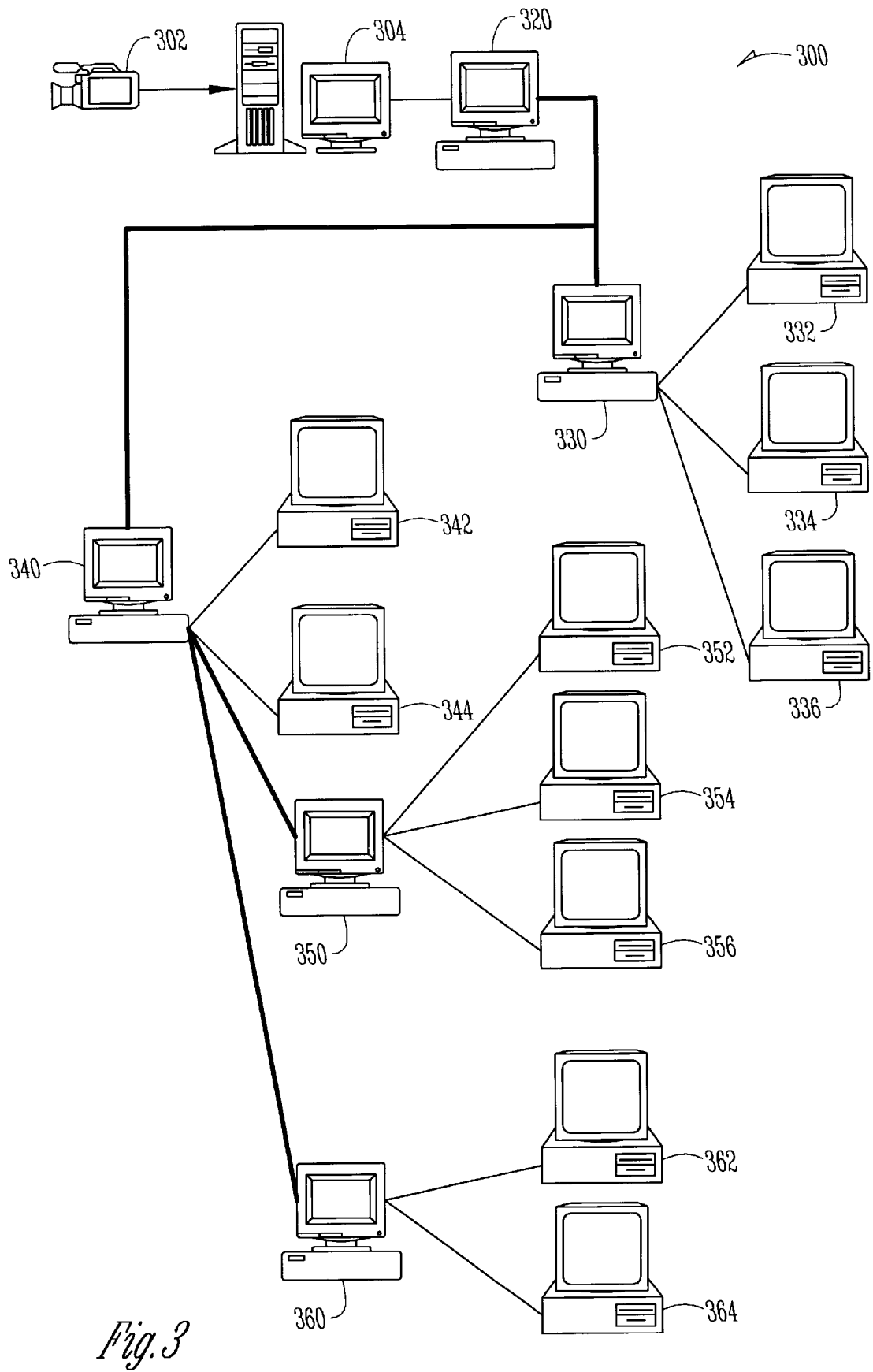
FIG. 3 is a block diagram of a network computer system according to the present invention that utilizes a number of secondary servers connected to recaster servers for delivery of multimedia data to clients.

FIG. 3 includes a computer network 300 that contains a source 302 for recording video, and an encoding server 304 for encoding the video into a number of different bandwidth points, and associated indexes, as described above. In one embodiment, the encoding server is referred to as the LiveStation 304. As will be further described below, with reference to FIG. 6, the LiveStation 304 configures and controls the network 300, according to an operator's criteria, for transmission of video/audio to clients. The LiveStation 304 provides the video file, containing the bandwidth points and indexes, in parallel TCP/IP sessions, to a server 320 referred to as a Recaster server. Upon receipt of the video file, the recaster server 320 provides the video file to a secondary server 330, which in turn provides the video to the clients 332, 334 and 336 by transmitting a bandwidth point to each of the clients, corresponding to the type of data channel used for connection. For example, the client 332 may connect to the secondary server 330 via a 28.8 Kbs data channel, while the clients 334, 336 may connect to the secondary server 330 via 56 Kbs data channels.

In addition, the recaster 320 provides the video file to a second recaster 340 that operates as both a recaster and a secondary server. The recaster 340 acts as a secondary server by providing particular bandwidth points to clients 342, 344, and as a recaster by providing the video file to secondary servers 350 and 360. The secondary servers 350, 360 then provide the video to clients 352, 354, 356 and 362, 364, respectively.

With the above network architecture described, it should be appreciated that real-time video is provided to each of the clients via a connection with a secondary server. And, that every secondary server has received a video file that contains all of the bandwidth points, and associated indexes, needed to service clients connecting over different data channels. Moreover, since each secondary server contains all of the indexes associated with the bandwidth points, any client can seek, rewind, or otherwise index the received video, regardless of which data channel type is used for connection. Furthermore, it should be appreciated that although particular reference has been made to transmission of a video file to the secondary servers, the recaster 320 also provides an audio file, as needed, to the secondary servers 330, 340, 350 and 360.

Figure 4:
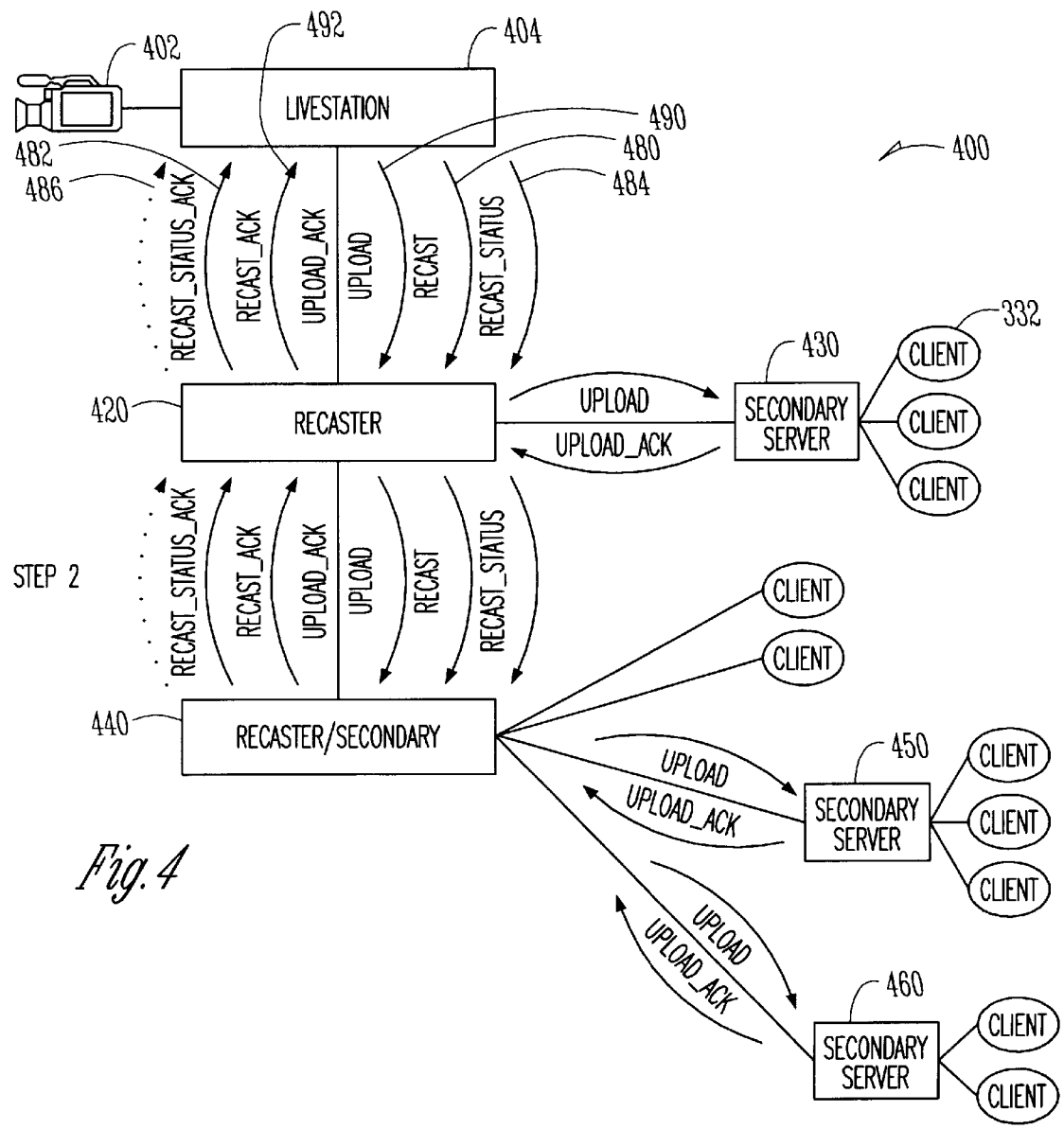
FIG. 4 is a block diagram illustrating network protocol between a LiveStation and a Recaster server, and between a Recaster server and a secondary server, according to the present invention.

To better understand the protocol used between the LiveStation 304 and the recaster 320, and between the recaster 320 and a secondary server 350, reference is now made to FIG. 4. In FIG. 4, a block diagram 400 is provided that illustrates the operational configuration of the network 300 described above. Real-time video/audio is captured by a recording source 402 and provided to a LiveStation 404. The video/audio is encoded into video/audio files, as described above. An operator at the LiveStation 404 configures the network 400 to transmit video/audio files to a Recaster 420, which in turn will transmit the video/audio files to secondary server 430, and a recaster/secondary server 440 which in turn will transmit the video/audio files to secondary servers 450 and 460. Transmission of the video/audio files from the LiveStation 404 to the recaster servers and secondary servers is "pushed" to the secondary servers by the LiveStation 404, rather than requiring clients to first request the data. To push the video/audio files to the secondary servers, connection is first made to all of the secondary servers as will be described below. After connection is made to the secondary servers, the video/audio is played, or transmitted to the secondary servers for access by clients.

To make a connection, the LiveStation 404 sends a recast command 480 to the Recaster 420. This command performs two functions. First, it lets the Recaster 420 know that live transmission of a video/audio is desired. Second, it provides header information that describes the configuration of the network for this transmission, as well as information on the video file to be transmitted. The information describing the configuration of the network specifies which devices in the network will be used as secondary servers, and which devices will be used as recasters. The information on the video file to be transmitted specifies the screen size of the video to be transmitted, e.g., 320×240, as well as the expected length of the video, e.g., 3 minutes, and the expected size required to store the video, e.g., 10 megabytes. Furthermore, the recast command 480 includes direction to the secondary servers as to whether they are to store the received video file for later retrieval by clients. One skilled in the art will appreciate that other information associated with video/audio files, or configuration of the network may be included in the header.

Upon receipt of the recast command 480, the Recaster 420 transmits a similar recast command to all downstream recasters, including the recaster 440. In addition, the Recaster 420 transmits an upload command 490 to all secondary servers designated by the recast command 480, including the secondary server 430. The upload command 490 alerts the secondary server 430 that video transmission is desired, and also specifies the video/audio file information described above. If the secondary server 430 is operational, and can operate to provide the video to clients, it responds with an upload_ack command 492, indicating to the Recaster 420 that it is ready to receive data. The recaster 440 transmits similar upload commands to the secondary servers 450, 460, and awaits their upload_ack responses. When the Recaster 420 receives an upload_ack from all downstream secondary servers, it provides a recast_ack response 482 to the LiveStation 404. At this point, the LiveStation 404 has alerted all downstream recasters and secondary servers that video/audio files will be transmitted, and specified the operational configuration of each of the recasters and secondary servers. In addition, if any of the recasters or secondary servers did not respond appropriately, the LiveStation 404 is alerted, allowing a user to reconfigure the network 400 before transmission.

Once configuration is successful, the LiveStation 404 provides a Recast_Status command 484 to the Recaster 420. Other recasters also provide a similar command to downstream recasters. The Recast_Status command 484 opens a communication channel to recasters to allow them to notify the LiveStation 404 of problems that occur during transmission of the audio/video files. If, for example, the secondary server 430 goes down during transmission of the audio/video files, the Recaster 420 can provide a Recast_Status_Ack response 486 to the LiveStation 404, to alert the operator of the LiveStation 404 of the problem. In some environments, the Recast_Status command 484 may not be needed, where the recasters can directly alert the LiveStation 404. However, for network environments that have firewalls between the LiveStation 404 and downstream recasters, the Recast_Status command 484 provides an open session that allows downstream problems to be communicated to the LiveStation 404, through the firewall.

Once connection is made by the LiveStation 404 to the Recaster 420, an operator at the LiveStation 404 can "play" or transmit the encoded video file to clients. To video file, and audio file if appropriate, is delivered to the Recaster 420. The Recaster 420 then provides the video file to downstream secondary servers. More specifically, multiple TCP/IP sessions are opened between the recaster 420 and the secondary server 430 to allow each of the bandwidth points, and associated indexes, within the video file, to be transmitted in parallel to the secondary server 430. This is illustrated by reference to FIG. 5.

Figure 5:
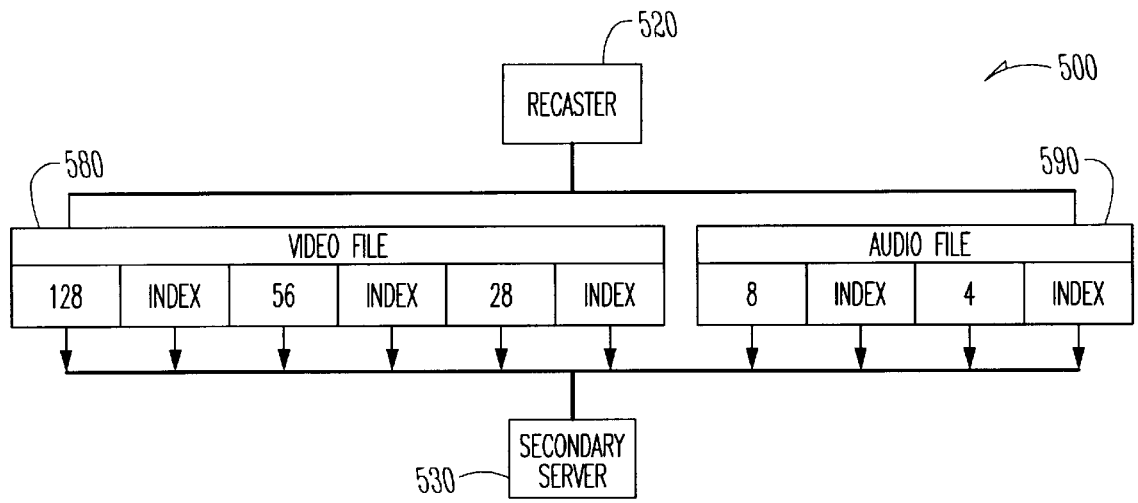
FIG. 5 is a block diagram illustrating parallel transfer of a number of different bandwidth points between a Recaster server and a secondary server, according to the present invention.

In FIG. 5, a block diagram 500 is provided that shows a Recaster 520 transmitting a video file 580 and an audio file 590 in parallel TCP/IP sessions to a secondary server 530. In one embodiment, the video file 580 contains bandwidth points for three different data channels including 28.8 Kbs, 56 Kbs and 128 Kbs, and their associated indexes. And, the audio file 590 contains bandwidth points for 8 Kbs, and 4 Kbs audio, along with their associated indexes. The indexes contain timestamp and offset pairs for particular locations within their associated bandwidth points. So, for transmission of the video file 580 and the audio file 590, 10 parallel sessions are opened between the Recaster 520, and the secondary server 530. One skilled in the art will appreciate that more or less parallel sessions may be opened, depending on the number of bandwidth points to be transmitted. Furthermore, similar parallel sessions are opened between each recaster, and its downstream secondary servers.

Thus, by providing parallel transfer of multiple bandwidth points, and their associated indexes, to downstream secondary servers, and by initiating the transfer of the video/audio files to the secondary servers, real-time video may be viewed by a large number of clients, connected over different data channel types, at essentially the same time. Moreover, each of the clients can index the video by sending commands to their secondary servers, regardless of the data channel used for connection. And, if a client's data channel is altered during transmission, its secondary server can dynamically switch to a more suitable bandwidth point.

Figure 6:
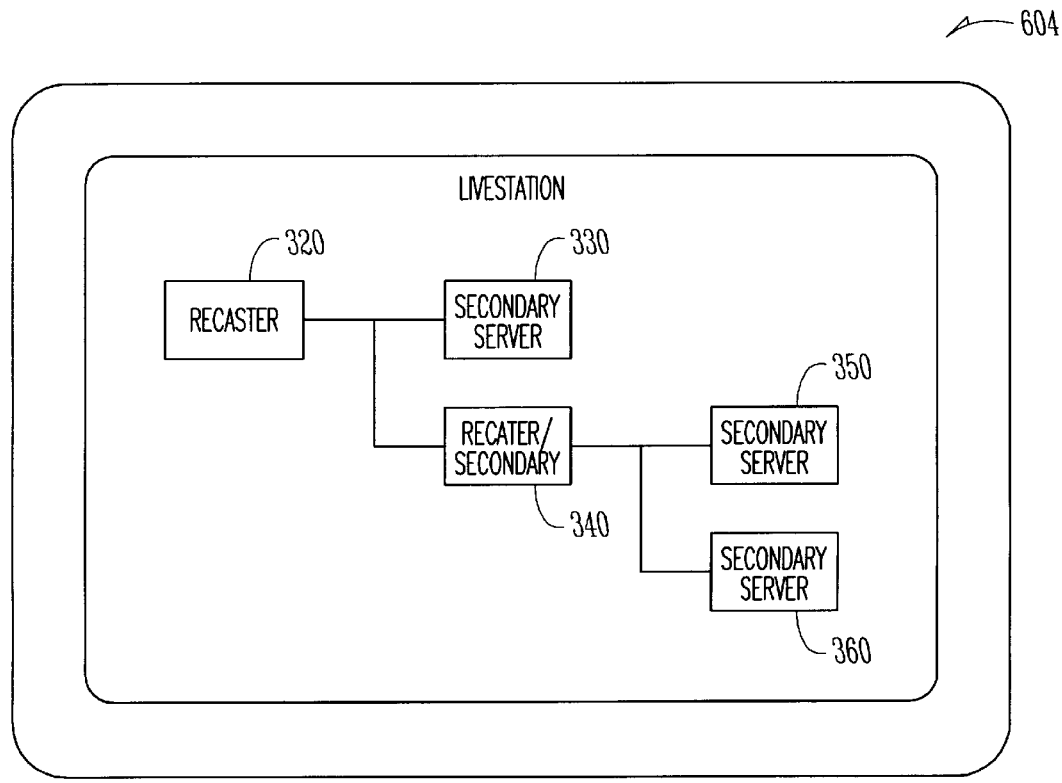
FIG. 6 is a screen shot of a LiveStation server that allows configuration and control of a video distribution network according to the present invention.

In addition, by pushing live data to secondary servers, rather than waiting for clients to request data, the protocol established by the present invention allows real-time centralized control over configuration and distribution of multimedia information. Referring to FIG. 6, a screen 604 is provided that illustrates the configuration of the computer network 300 that was established by an operator of the LiveStation 304. The screen 604 shows the recaster 320 connected to the secondary server 330 and the recaster/secondary server 340. The secondary server 340 is connected to secondary servers 350 and 360. The configuration of the network 300 is designed using the screen 604 at the LiveStation 304 prior to making a connection. Once the connection is made, status of each of the recasters and secondary servers may be monitored on the screen 604. Furthermore, modification of the configuration may be made, as needed, by the operator.

The above described invention has been discussed in considerable detail with reference to certain preferred versions thereof. However, other versions are possible. For example, in situations where a large number of low bandwidth connections are required, the video file may be designed to contain a single bandwidth point, and associated index, rather than having multiple bandwidth points. Or, in the alternative, a bandwidth point may be used which is applicable only to high speed data channels. Or, it is possible that simultaneous transmission of multiple video files is desired. The number of bandwidth points within a video file, or the number of video files to be transmitted, is determined solely by the operator, and the capacity of the LiveStation and the network being used to distribute the information. A further version may include the ability to utilize the index file to rewind a live event as it is happening. For example, if a sporting event is being broadcast using the present invention, a client could rewind the last play, watch it, and then go back to live coverage. This enhanced feature is possible because the secondary servers receive all of information, including the index files, that is available on the recaster server.

Those skilled in the art should appreciate that they can readily use the disclosed conception and specific embodiments as a basis for designing or modifying other structures for carrying out the same purposes of the present invention. In addition, it should be understood that various changes, substitutions and alterations can be made herein without departing from the spirit and scope of the invention as defined by the appended claims.

We claim:

1. A computer network for distributing video data, the network comprising:
   an encoding server, coupled to a video source that provides the video data, for encoding the video data into a video file for distribution over the computer network, said video file comprising:
      a plurality of bandwidth points, each of said bandwidth points corresponding to the video data, encoded for distribution over a particular data channel; and
      a plurality of indexes, corresponding to said plurality of bandwidth points;
   a recaster server, coupled to said encoding server, for receiving said video file from said encoding server, and for transferring said video file to a secondary server, said secondary server for transmitting to a client over a first data channel, one of said plurality of bandwidth points;
   wherein selection of said one of said plurality of bandwidth points transmitted to said client depends on the bandwidth of said first data channel.

2. The computer network for distributing video data, as recited in claim 1, wherein said encoding server further provides audio data associated with the video data, encoded for distribution over the computer network, to said recaster server.

3. The computer network for distributing video data, as recited in claim 2, wherein said audio data is encoded into an audio file, said audio file comprising a plurality of audio bandwidth points and associated audio indexes.

4. The computer network for distributing video data, as recited in claim 3, wherein said audio file is received by said recaster server, in parallel with said video file.

5. The computer network for distributing video data, as recited in claim 4, wherein said recaster server provides said audio file and said video file in parallel to said secondary server.

6. The computer network for distributing video data, as recited in claim 1, wherein said particular data channel comprises:
   a plain old telephone service (POTS) telephone line;
   a high speed integrated digital service network (ISDN) telephone line; or
   a local area network.

7. The computer network for distributing video data, as recited in claim 6, wherein a first one of said plurality of bandwidth points corresponds to the video data encoded for distribution over said POTS telephone line.

8. The computer network for distributing video data, as recited in claim 7, wherein a second one of said plurality of bandwidth points corresponds to the video data encoded for distribution over said ISDN telephone line.

9. The computer network for distributing video data, as recited in claim 1, wherein said encoding server further provides an organization header to said recaster server, specifying a plurality of secondary servers to receive said video file.

10. The computer network for distributing video data, as recited in claim 9, wherein said recaster server provides said video file to said plurality of secondary servers, according to said organization header.

11. The computer network for distributing video data, as recited in claim 9, wherein said organization header further specifies whether said video file is to be saved on said recaster or ones of said plurality of secondary servers.

12. The computer network for distributing video data, as recited in claim 1, wherein said plurality of bandwidth points and said plurality of indexes within said video file are received by said recaster server, in parallel.

13. The computer network for distributing video data, as recited in claim 12, wherein said parallel reception of said plurality of bandwidth points and said plurality of indexes is performed by a plurality of TCP/IP sessions between said recaster server and said encoding server.

14. The computer network for distributing video data, as recited in claim 1, wherein said client connects to said secondary server over said first data channel having a particular bandwidth.

15. The computer network for distributing video data, as recited in claim 14, wherein said secondary server provides to said client said one of said plurality of bandwidth points, corresponding to the bandwidth of said first data channel.

16. The computer network for distributing video data, as recited in claim 1, wherein the video data comprises audio and video information.

17. The computer network for distributing video data, as recited in claim 16, wherein said audio and video information is encoded by said encoding server for efficient transmission of the video data to said client.

18. The computer network for distributing video data, as recited in claim 1, wherein the video data comprises real-time audio/video data.

19. The computer network for distributing video data, as recited in claim 1, wherein said video source comprises a video capture card.

20. The computer network for distributing video data, as recited in claim 1, wherein said encoding server further comprises a permanent storage medium for storing said video file.

21. The computer network for distributing video data, as recited in claim 1, wherein said encoding server comprises a personal computer.

22. The computer network for distributing video data, as recited in claim 1, wherein said plurality of indexes comprise time and offset references for video frames within said plurality of bandwidth points.

23. The computer network for distributing video data, as recited in claim 1, wherein said plurality of bandwidth points further comprises:
   a first bandwidth point encoded for transmission over a slow data channel; and
   a second bandwidth point encoded for transmission over a faster data channel.

24. The computer network for distributing video data, as recited in claim 1, wherein said video file is pushed by said encoding server to said recaster server.

25. The computer network for distributing video data, as recited in claim 1, wherein said recaster server comprises a personal computer.

26. The computer network for distributing video data, as recited in claim 1, wherein said recaster server is coupled to said encoding server via a local area network.

27. The computer network for distributing video data, as recited in claim 1, wherein said recaster server receives instruction from said encoding server directing said recaster to push said video file to said secondary server.

28. The computer network for distributing video data, as recited in claim 1, wherein said recaster server further transfers said video file to a second recaster server.

29. A client/server computing system for distributing real-time and on demand multimedia data from an encoding server to a plurality of clients, the clients receiving the multimedia data over a plurality of data channels, the computing system comprising:
   a recaster server, for receiving a video file from the encoding server;
   a secondary server, coupled to said recaster server, for receiving said video file from said recaster; and
   a plurality of clients, coupled to said secondary server over the plurality of data channels;
   said video file further comprising:
      a plurality of bandwidth points, each of which are encoded for transmission over different ones of the plurality of data channels; and
      a plurality of indexes, associated with said plurality of bandwidth points;
   wherein said plurality of bandwidth points and said plurality of indexes are received by said secondary server in parallel.

30. The client/server computing system, as recited in claim 29, wherein said secondary server provides a first bandwidth point from said plurality of bandwidth points, to a first client from said plurality of clients, over a first data channel from said plurality of data channels.

31. The client/server computing system, as recited in claim 30, wherein said secondary server also provides a second bandwidth point from said plurality of bandwidth points, to a second client from said plurality of clients, over a second data channel from said plurality of data channels.

32. The client/server computing system, as recited in claim 29, wherein the encoding server instructs said recaster server as to which secondary server is to receive said video file.

33. The client/server computing system, as recited in claim 32 wherein the encoding server also instructs said recaster server as to whether said secondary server is to save the video file.

34. The client/server computing system, as recited in claim 29, wherein the encoding server encodes the multimedia data and produces said video file for distribution among said plurality of clients.

35. The client/server computing system, as recited in claim 29, wherein said recaster server is coupled to the encoding server via a local area network.

36. The client/server computing system, as recited in claim 29, wherein said video file contains all video information necessary to transmit the multimedia data over any of the plurality of data channels.

37. The client/server computing system, as recited in claim 29, wherein the plurality of data channels comprises:
   a POTS telephone line;
   an ISDN telephone line; and
   a local area network (LAN).

38. The client/server computing system, as recited in claim 29, wherein since said plurality of bandwidth points and said plurality of indexes are received by said secondary server in parallel, said secondary server can dynamically select which of said plurality of bandwidth points will be transmitted to ones of said plurality of clients.

39. The client/server computing system, as recited in claim 29, wherein said recaster also receives an audio file from the encoding server for distribution with said video file.

40. The client/server computing system, as recited in claim 29, wherein said recaster server transfers said video file to said secondary server upon instruction from the encoding server.

41. The client/server computing system, as recited in claim 29, wherein the encoding server initiates transfer of said video file with said recaster server.

42. The client/server computing system, as recited in claim 29, wherein said recaster server initiates transfer of said video file with said secondary server.

43. The client/server computing system, as recited in claim 29, wherein if said secondary server is unable to complete reception of said video file, the encoding server is notified.

44. A method for distributing real-time multimedia data to clients over dissimilar data channels, the method comprising the steps of:
   providing a recaster server for transferring a video file of encoded multimedia data to a secondary server, the video file having a plurality of bandwidth points, and an associated plurality of indexes;
   initiating transfer of the video file to the secondary server;
   transferring the video file to the secondary server, said step of transferring causing the plurality of bandwidth points, and the associated plurality of indexes, to be transferred to the secondary server in parallel;
   providing a first one of the plurality of bandwidth points to a first client over a first data channel; and
   providing a second one of the plurality of bandwidth points to a second client over a second data channel;
   wherein the first and second data channels have a different bandwidth; and
   wherein the first and second clients can receive and view the multimedia data at essentially the same time.

45. The method for distributing real-time multimedia data, as recited in claim 44, wherein said step of initiating transfer of the video file to the secondary server further comprises the steps of:

sending an upload command from the recaster server to the secondary server, indicating that a video file is to be transferred to the secondary server; and sending an upload acknowledge response from the secondary server to the recaster server indicating whether the secondary server can receive the video file.

46. The method for distributing real-time multimedia data, as recited in claim 45, wherein if the secondary server cannot receive the video file:

indicating to the recaster server that the secondary server cannot receive the video file.

47. The method for distributing real-time multimedia data, as recited in claim 44, wherein the first one of the plurality of bandwidth points comprises video data encoded for transmission at approximately 28.8 kilobits per second.

48. The method for distributing real-time multimedia data, as recited in claim 47, wherein the first data channel has a bandwidth of approximately 28.8 kilobits per second.

49. The method for distributing real-time multimedia data, as recited in claim 44, wherein the second one of the plurality of bandwidth points comprises video data encoded for transmission at approximately 56 kilobits per second.

50. The method for distributing real-time multimedia data, as recited in claim 49, wherein the second data channel has a bandwidth of approximately 56 kilobits per second.

51. The method for distributing real-time multimedia data, as recited in claim 44, wherein the real-time multimedia data comprises live captured video and audio data.

52. The method for distributing real-time multimedia data, as recited in claim 44, wherein the method further comprises the steps of:

encoding live video data into a plurality of bandwidth points, having associated indexes; and combining the plurality of bandwidth points and associated indexes into a video file.

53. The method for distributing real-time multimedia data, as recited in claim 44, wherein the method further comprises the steps of:

initiating a recast session with the recaster server for distributing the video file to secondary servers;

awaiting an acknowledgment from the recaster server before transferring the video file to the recaster server; and transferring the video file to the recaster server.

54. The method for distributing real-time multimedia data, as recited in claim 44, wherein said step of transferring the video file to the secondary server utilizes a plurality of TCP/IP sessions for transferring the plurality of bandwidth points, and the associated indexes, to the secondary server in parallel.

55. The method for distributing real-time multimedia data, as recited in claim 44, wherein the method further comprises the steps of:

decoding the first one of the plurality of bandwidth points for viewing by the first client; and decoding the second one of the plurality of bandwidth points for viewing by the second client.

56. The method for distributing real-time multimedia data, as recited in claim 44, wherein either of the first client or the second client can rewind the viewed multimedia data by transmitting a rewind command to the secondary server.

57. The method for distributing real-time multimedia data, as recited in claim 44, wherein the method further comprises the step of:

indicating to the secondary server whether the transferred video file is to be saved, for later on-demand retrieval by a client.

* * * * *